United States Patent
Friggstad (10) Patent No.: US 8,727,032 B2
(45) Date of Patent: May 20, 2014

(54) IMPLEMENT WITH TOOL BAR BEHIND WING FRAMES

(75) Inventor: Terrance Alan Friggstad, Saskatoon (CA)

(73) Assignee: CNH Industrial Canada, Ltd., Saskatoon, Saskatchewan (CA)

(*) Notice: Subject to any disclaimer, the term of this patent is extended or adjusted under 35 U.S.C. 154(b) by 7 days.

(21) Appl. No.: 12/987,534

(22) Filed: Jan. 10, 2011

(65) Prior Publication Data

US 2012/0175138 A1   Jul. 12, 2012

(51) Int. Cl.
*A01B 49/00* (2006.01)

(52) U.S. Cl.
USPC ........................................................ 172/311

(58) Field of Classification Search
USPC .............. 172/311, 456, 448, 624.5, 626, 679, 172/677, 680, 683, 773, 775, 776; 37/234, 37/468; 56/14.9, 15.6, 15.9, 377, 380, 384
See application file for complete search history.

(56) References Cited

U.S. PATENT DOCUMENTS

| | | | |
|---|---|---|---|
| 3,414,064 A | 12/1968 | Foster | |
| 3,635,495 A | 1/1972 | Orendorff | |
| 3,797,580 A | 3/1974 | Roth | |
| 3,971,446 A * | 7/1976 | Nienberg | 172/311 |
| 4,030,551 A | 6/1977 | Boetto et al. | |
| 4,042,045 A * | 8/1977 | Hake | 172/311 |
| 4,056,148 A * | 11/1977 | Blair | 172/311 |
| 4,058,172 A * | 11/1977 | Blair et al. | 172/311 |
| 4,133,391 A * | 1/1979 | Richardson et al. | 172/311 |
| 4,206,816 A * | 6/1980 | Richardson et al. | 172/311 |
| 4,314,610 A * | 2/1982 | Riewerts et al. | 172/776 |
| 4,318,444 A * | 3/1982 | Hake | 172/456 |
| 4,364,581 A * | 12/1982 | Shoup | 172/311 |
| RE31,209 E * | 4/1983 | Anderson | 172/311 |
| 4,496,004 A * | 1/1985 | Frase et al. | 172/311 |
| 4,660,651 A | 4/1987 | Pfenninger et al. | |
| 4,896,732 A * | 1/1990 | Stark | 172/311 |
| 4,944,355 A | 7/1990 | Karchewski | |
| 5,255,756 A * | 10/1993 | Follmer et al. | 180/401 |
| 5,305,590 A * | 4/1994 | Peeters | 56/377 |
| 5,685,135 A * | 11/1997 | Menichetti | 56/365 |
| 5,687,798 A * | 11/1997 | Henry et al. | 172/311 |
| 5,829,370 A * | 11/1998 | Bender | 111/54 |
| 5,918,452 A * | 7/1999 | Kelderman | 56/377 |
| 6,112,827 A * | 9/2000 | Reiber et al. | 172/311 |
| 6,202,756 B1 * | 3/2001 | Hundeby et al. | 172/311 |
| 6,293,352 B1 * | 9/2001 | Hundeby et al. | 172/456 |
| 6,305,478 B1 * | 10/2001 | Friggstad | 172/458 |
| 6,374,921 B1 * | 4/2002 | Friggstad | 172/311 |
| 6,374,923 B1 * | 4/2002 | Friggstad | 172/383 |

(Continued)

FOREIGN PATENT DOCUMENTS

WO   WO 8801470         3/1988
WO   WO 2010144447 A2 * 12/2010 ............. A01B 73/06

*Primary Examiner* — Árpád Fábián-Kovács
(74) *Attorney, Agent, or Firm* — Rebecca L. Henkel (57) ABSTRACT

An agricultural implement including a hitch assembly configured to couple to a tow vehicle, a plurality of wing tool bars coupled transversely to the hitch assembly, and a plurality of wing frames pivotally coupled to the plurality of wing tool bars. Each wing frame is configured to support a plurality of row units and is positioned forward of a respective wing tool bar. Each wing tool bar is configured to transfer torque to the plurality of row units when the plurality of wing frames is in a ground engaging position.

16 Claims, 5 Drawing Sheets

(56) References Cited

U.S. PATENT DOCUMENTS

| | | | |
|---|---|---|---|
| 6,382,326 B1 * | 5/2002 | Goins et al. | 172/239 |
| 6,561,283 B2 * | 5/2003 | Hundeby | 172/459 |
| 6,675,907 B2 | 1/2004 | Moser et al. | |
| 6,702,035 B1 * | 3/2004 | Friesen | 172/311 |
| 6,834,488 B2 * | 12/2004 | Menichetti | 56/378 |
| 6,860,335 B2 | 3/2005 | Arnett | |
| 7,073,604 B1 * | 7/2006 | Dobson et al. | 172/311 |
| 7,350,347 B2 * | 4/2008 | Staheli | 56/396 |
| 7,360,353 B2 * | 4/2008 | Hruska et al. | 56/377 |
| 7,540,139 B2 * | 6/2009 | Rowse et al. | 56/377 |
| 7,562,719 B1 * | 7/2009 | Misenhelder et al. | 172/456 |
| 7,581,597 B2 * | 9/2009 | Neudorf et al. | 172/311 |
| 7,712,544 B1 * | 5/2010 | Misenhelder et al. | 172/311 |
| 7,740,084 B2 * | 6/2010 | Rosenboom | 172/387 |
| 7,827,774 B2 * | 11/2010 | Dow et al. | 56/192 |
| 7,849,933 B2 * | 12/2010 | Marggi | 172/311 |
| 8,215,413 B2 * | 7/2012 | Friggstad | 172/452 |
| 2002/0005629 A1 * | 1/2002 | Rosenboom | 280/651 |
| 2004/0200203 A1 * | 10/2004 | Dow et al. | 56/375 |
| 2009/0101369 A1 * | 4/2009 | Marggi | 172/1 |
| 2010/0018729 A1 | 1/2010 | Hulicsko | |

* cited by examiner

IMPLEMENT WITH TOOL BAR BEHIND WING FRAMES

BACKGROUND

The invention relates generally to a folding implement frame, and more specifically, to an implement frame having wing tool bars positioned behind wing frame assemblies relative to a direction of travel.

A range of agricultural implements have been developed and are presently in use for tilling, planting, harvesting, and so forth. Seeders, for example, are commonly towed behind tractors and may cover wide swaths of ground which may be tilled or untilled. Such devices typically open the soil, dispense seeds in the soil opening, and re-close the soil in a single operation. In seeders, seeds are commonly dispensed from bulk seed tanks and distributed to row units by a distribution system. To make the planting operation as efficient as possible, very wide swaths of ground may be covered by extending wings on either side of a central tool bar section of the implement pulled by the tractor. Included in the wing assemblies are generally tool bars, tool frames, row units, and support wheels. Certain wing assemblies are configured to fold rearwardly or forwardly for transport. In such configurations, tool frames coupled to each wing assembly may first fold upwardly about respective tool bars. The wing assemblies may then fold rearwardly or forwardly. This arrangement provides a compact profile for transport. However, due to the high center of gravity and the relatively narrow track of the wheel units adjacent to the connection between the wing tool bars and the central tool bar, the implement may become unstable during transport. Consequently, it may be desirable to establish a wider track for these wheel units when the implement is in a transport position to increase stability.

BRIEF DESCRIPTION

In one embodiment, an agricultural implement is provided including a hitch assembly configured to couple to a tow vehicle, a plurality of wing tool bars coupled transversely to the hitch assembly, and a plurality of wing frames pivotally coupled to the plurality of wing tool bars, wherein each wing frame is configured to support a plurality of row units, each wing frame is positioned forward of a respective wing tool bar, and each wing tool bar is configured to transfer torque to the plurality of row units when the plurality of wing frames is in a ground engaging position.

In an alternative embodiment, an agricultural implement includes a hitch assembly configured to couple to a tow vehicle, a plurality of wing tool bars coupled transversely to the hitch assembly, and a plurality of wing frames pivotally coupled to the plurality of wing tool bars, wherein each wing frame is configured to support a plurality of row units, each wing frame is positioned forward of a respective wing tool bar, and each wing tool bar is configured to transfer torque to the plurality of row units when the plurality of wing frames is in a ground engaging position. The agricultural implement further includes a cart coupled to the hitch assembly, wherein the cart is configured to follow the plurality of wing tool bars, the plurality of wing tool bars is configured to fold rearwardly to a transport position, and the plurality of wing tool bars is configured to capture the cart within the plurality of wing frames when in the transport position.

In another embodiment, an agricultural implement includes a hitch assembly configured to couple to a tow vehicle, a plurality of wing tool bars coupled transversely to the hitch assembly, and a plurality of wing frames pivotally coupled to the wing tool bars, wherein each wing frame is configured to support a plurality of row units, each wing frame is positioned forward of a respective wing tool bar, and each wing tool bar is configured to transfer torque to the plurality of row units when the plurality of wing frames is in a ground engaging position. The agricultural implement also includes a first wheel assembly coupled to a first wing tool bar adjacent to the hitch assembly and a second wheel assembly coupled to a second wing tool bar adjacent to the hitch assembly, wherein the first and second wheel assemblies are configured to move away from one another to provide additional stability while in a transport position.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
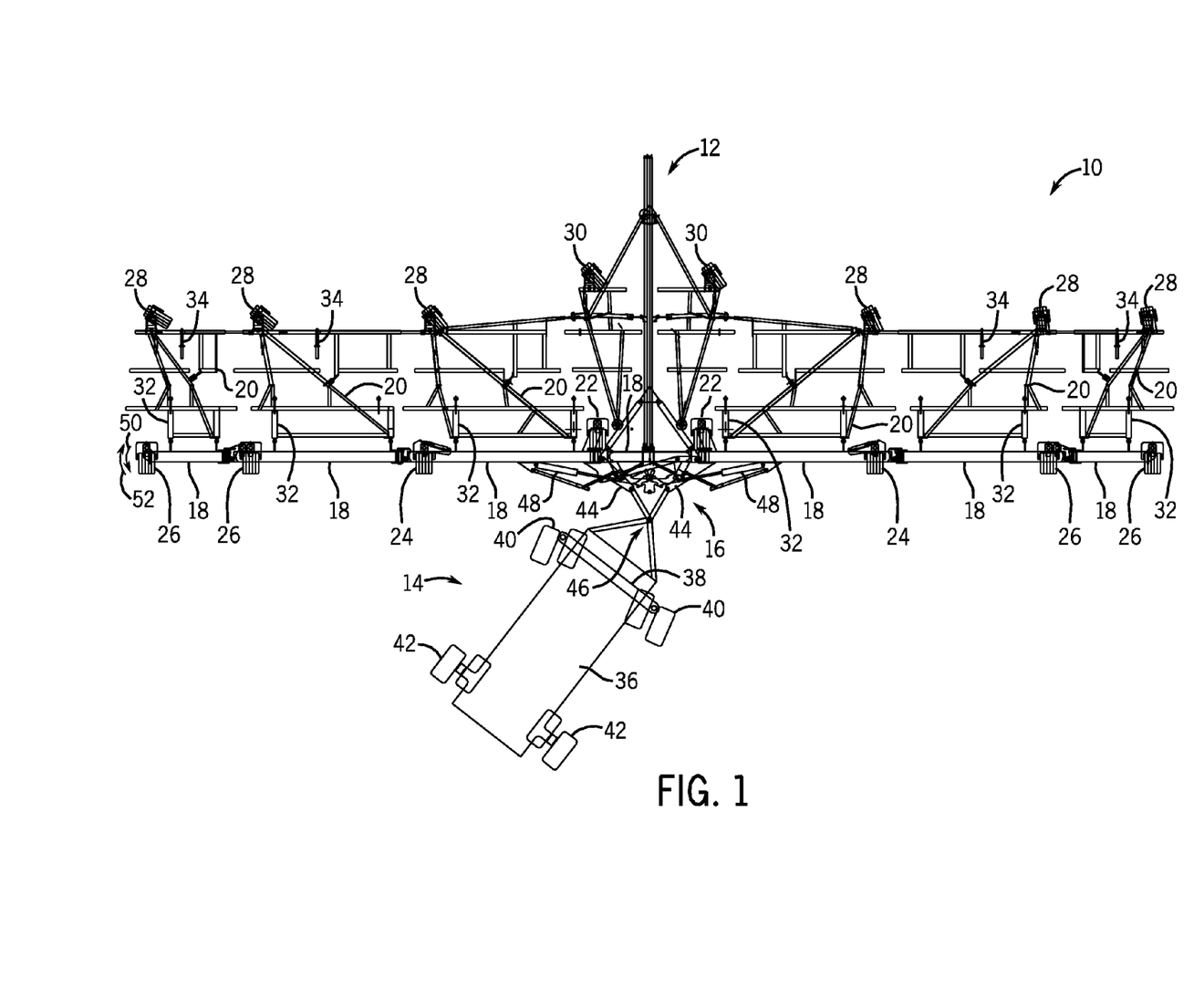
FIG. 1 is a top view of a folding implement in a ground engaging position, depicting an embodiment with wing tool bars positioned behind wing frames.

FIG. 1 is a top view of a folding implement in a ground engaging position, depicting an embodiment with wing tool bars positioned behind wing frames. In the illustrated embodiment, an implement 10 includes a hitch assembly 12. The hitch assembly 12 is configured to connect to a tow vehicle (not shown), such as a tractor, thereby enabling the tow vehicle to pull the implement 10 through a field. A cart 14 is also coupled to the hitch assembly 12 by a cart hitch portion 16 of the hitch assembly 12. In this configuration, the cart 14 will follow the implement 10 as the implement is pulled through the field.

The implement 10 is illustrated with wing tool bars 18 coupled transversely to the hitch assembly 12. The wing tool bars 18 are configured to pivotally rotate rearwardly from the ground engaging position to a folded transport position. Wing frames 20 are coupled to the wing tool bars 18 at multiple locations spanning the wing tool bars 18. As illustrated, the wing tool bars 18 are positioned behind the wing frames 20 relative to a direction of travel. Accordingly, with the wing tool bars 18 following behind the wing frames 20, the wing tool bars 18 may provide additional torque to the wing frames 20, thereby driving ground engaging tools (e.g., within row units coupled to the wing frames 20) into the soil to facilitate enhanced product delivery. In addition, with the wing frames 20 positioned closer to the tow vehicle, an operator of the tow vehicle may have enhanced visibility of the operational components of the wing frames 20 (e.g., row units, hydraulic assemblies, etc.). As will be appreciated, components of the hitch assembly 12, wing tool bars 18, and wing frames 20 may be made of any suitable material, such as steel.

Although a specific number of wing tool bars 18 and wing frames 20 are shown, an implement 10 may have fewer or more wing tool bars 18 and wing frames 20. The number of wing tool bars 18 and wing frames 20 may be based partially on the desired length of wings on each side of the implement 10 and/or on the particular layout used. For example, one embodiment may include wings of approximately 50 feet on each side of the hitch assembly 12. The wings may have wing tool bars 18 arranged in approximately 10 feet segments.

Wheel assemblies 22, 24, 26, 28, and 30 enable the wing tool bars 18 and wing frames 20 to move along the soil while the implement 10 is in the illustrated ground engaging position. As illustrated, the wheel assemblies 28 are directly attached to the wing frames 20. FIG. 1 depicts the implement 10 making a left turn. Therefore, wheel assemblies 28 and 30 are shown pointing to the left, while wheel assemblies 22, 24, and 26 are in a straight position. As such, the wheel assemblies 22, 24, and 26 maintain a fixed position perpendicular to the wing tow bars 18 while in the ground engaging position. Furthermore, the wheel assemblies 28 and 30 are allowed to rotate, thereby enhancing the turning radius of the implement 10. However, it should be noted that any of the wheel assemblies 22, 24, 26, 28, and 30 may be locked into a fixed position or allowed to rotate based at least partially on a locking mechanism on the wheel assembly and on the position of the implement 10, as well as the desired stability and turning capabilities of the implement 10. For example, the wheel assemblies 22, 26 may be locked in a fixed position while the implement 10 is in the ground engaging position, and allowed to rotate while the implement 10 is in the folded transport position.

Figure 3:
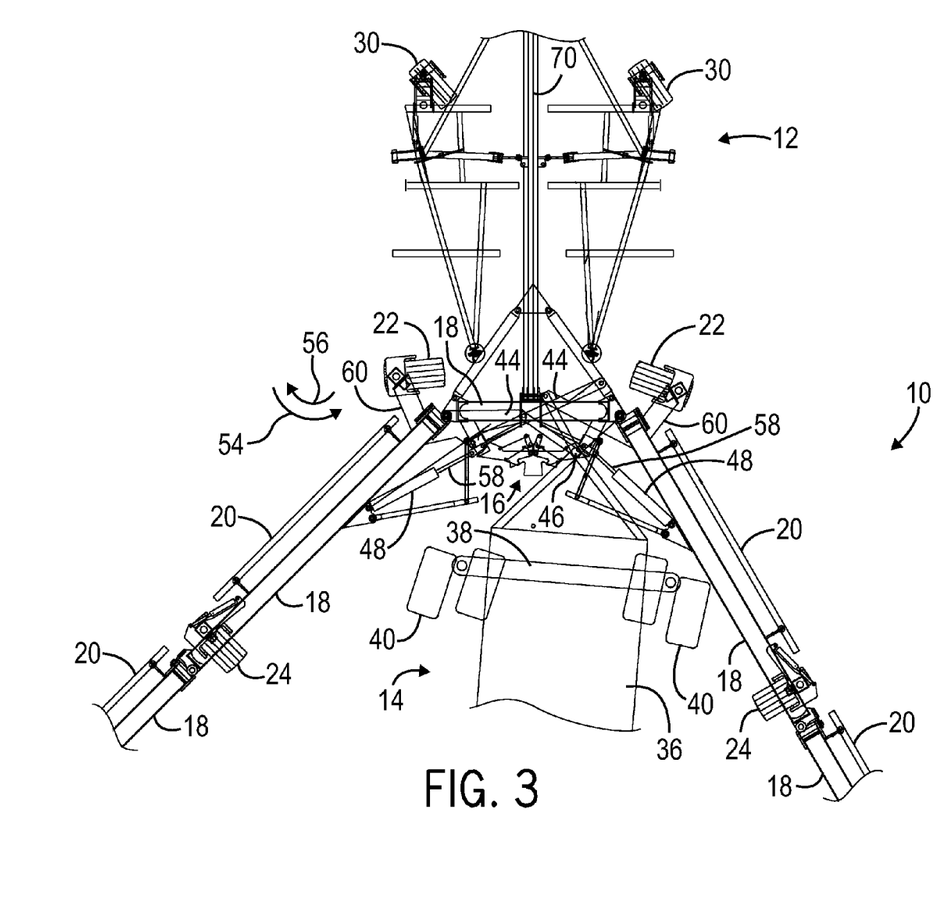
FIG. 3 is a detailed top view of an embodiment of a cart connected to a hitch assembly, with the folding implement in a folded position between the ground engaging position and a transport position.
Figure 4:
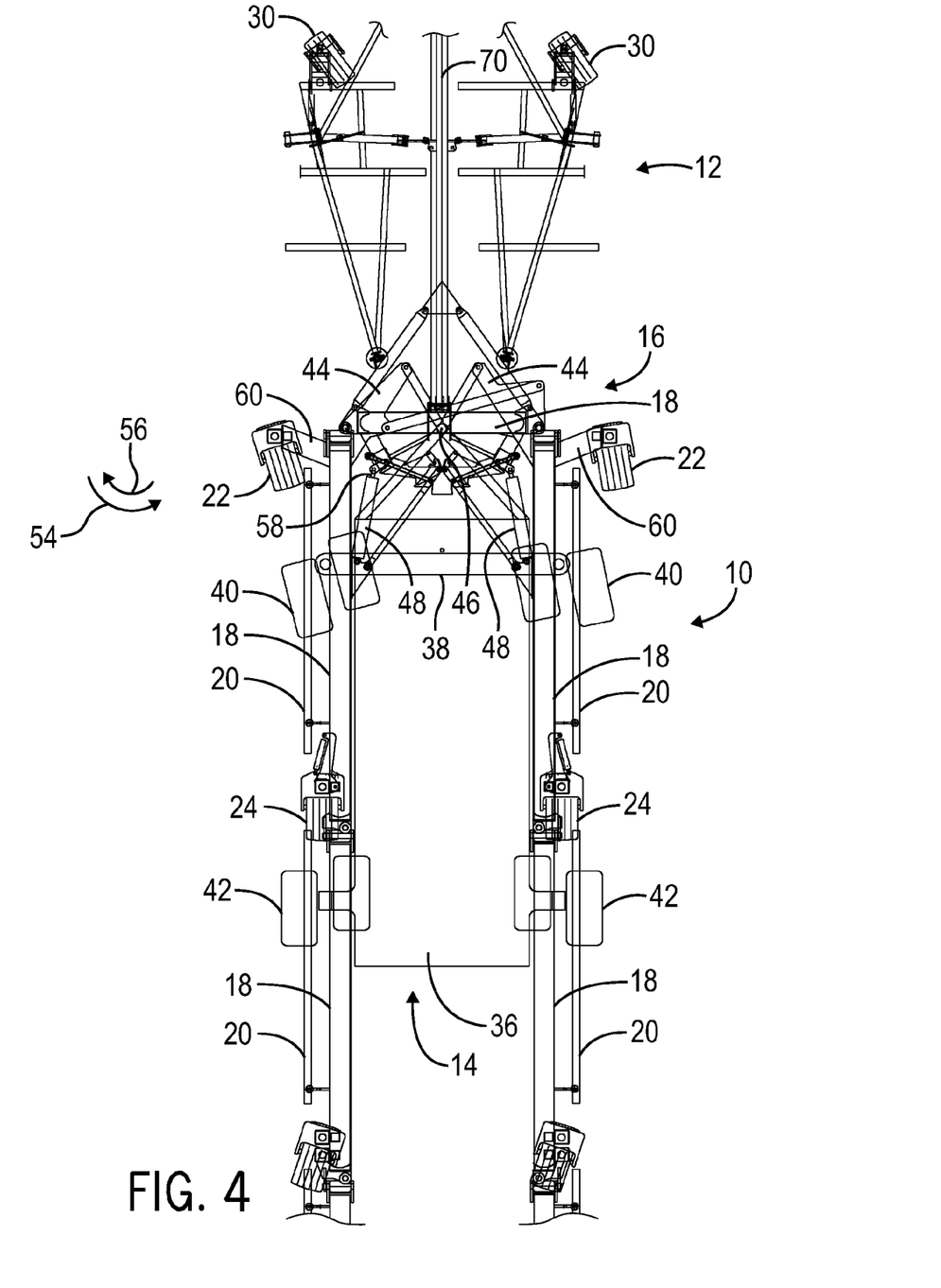
FIG. 4 is a detailed top view of the folding implement, as shown in FIG. 1, in a folded transport position.

The wheel assemblies 22 are mounted to the wing tool bars 18 such that when the implement 10 is placed in the folded transport position, the wheel assemblies 22 expand outward from the hitch assembly 12 to provide a more stable base for the implement 10 during transport, as shown in greater detail in FIGS. 3-4. For example, the wheel assemblies 22 may be spaced approximately 10 feet apart when in the ground engaging position. Conversely, when transitioned to the folded transport position, the wheel assemblies 22 may move away from one another to provide an approximately 16 foot track. This wider track helps to maintain stability of the implement 10 during transport.

The wheel assemblies 28 are coupled to the wing frames 20, and provide support to the wing frames 20 while the implement 10 is in the ground engaging position. The wheel assemblies 30 are coupled to the hitch assembly 12, and serve to support the hitch assembly 12. Although a certain number of wheel assemblies 22, 24, 26, 28, and 30 are depicted in FIG. 1, any number of wheel assemblies may be used. The wheel assemblies 22, 24, 26, 28, and 30 may be positioned with generally equal spacing between each wheel assembly, or alternatively the wheel assemblies may be positioned with different spacing. For example, some embodiments may implement "controlled traffic" spacing, where the wheel assemblies are spaced in approximately 10 foot intervals to limit soil compaction.

In the illustrated embodiment, the implement 10 includes wing frame actuators 32 configured to rotate the wing frames 20 in an upward direction 50 to transition the wing frames 20 from the illustrated ground engaging position to a folded transport position. For example, hydraulic pressure may be applied to the actuators 32, causing a retraction of a piston rod (not shown) and urging the wing frames 20 to rotate in the upward direction 50. With the wing frames 20 in the folded position, row units that may be attached to the wing frames 20 will disengage the soil, thereby facilitating transport of the implement 10 down a narrow road, for example. In addition, a flow of product (e.g., seeds, fertilizer, etc.) to ground engaging tools attached to the row units may be temporarily suspended while the wing frames 20 are in the folded position. Furthermore, with the wing frames 20 in the folded position, the wing tool bars 18 provide structural support to hold the wing frames 20 in place.

Conversely, the wing frames 20 may be transitioned to the ground engaging position by applying hydraulic pressure to the actuators 32 causing an extension of the piston rod and urging the wing frames 20 to rotate in a downward direction 52. With the wing frames 20 in the illustrated ground engaging position, ground engaging tools of the row units may engage the soil, thereby facilitating seed deposition into the soil.

As will be appreciated, when an implement 10 in the ground engaging position travels across a field, there may be difficulty obtaining enough downward torque to push ground engaging tools into the ground. For example, in configurations where the wing frames follow the wing tool bars, insufficient downward force may be applied to push ground engaging tools into the ground at a desired depth. The problem may be compounded as wing frame widths increase, with large wingspans of 80 or 100 feet, for example. By positioning the wing tool bars 18 behind the wing frames 20, with the wing tool bars 18 following the wing tool frames 20, additional torque is applied to the wing frames 20 as the implement is towed across a field. Consequently, additional downward force will be applied to the ground engaging tools of row units coupled to the wing frames. This downward loading may substantially reduce or eliminate the possibility of ground engaging tools being inadvertently lifted off the ground, and/or not reaching the correct penetration depth. Furthermore, additional downward loading may result from the tow vehicle forcing a front portion of the tow assembly 12 downwardly to drive the tool bars 18 downwardly. The added torque may enable implements 10 with wingspans of 100 feet or more to operate effectively, without additional ballast, to deliver product to a field.

Locking mechanisms 34 are located on the wing frames 20 to selectively block actuation of the wing frames 20. The locking mechanisms 34 are shown in more detail in FIG. 5. Functionally, the locking mechanisms 34 are configured to be locked while in the implement 10 is in the ground engaging position, and to be unlocked while the implement 10 is in the folded transport position. In addition, the locking mechanisms 34 operate with pins being inserted into or removed from telescopic section insertion points in the wing frames 20. When the pins are inserted into the insertion points, the wing frames 20 are in a locked state that blocks lateral movement of the wing frames 20 with respect to one another. When the pins are removed from the insertion points, the wing frames 20 are in an unlocked state that facilitates movement of the wing frames 20, thereby enabling articulation of the wing frames 20 as the implement is towed. Furthermore, the pins may be inserted or removed by cylinders configured to remove the pins when the wing frames 20 are placed in the folded transport position, and to insert the pins when the wing frames 20 are placed in the ground engaging position. While in the locked position, the wing frames 20 remain rigid with minimal contraction or expansion through the frame. However, in the unlocked position, the wing frames 20 are allowed to articulate to create a less rigid structure for transportation.

The cart 14 is attached to the implement 10 by the cart hitch portion 16 of the hitch assembly 12. The cart 14 includes a storage tank 36, a frame 38, and wheel assemblies 40, 42. In certain configurations, the storage tank 36 includes multiple compartments for storing various flowable particulate materials. For example, one compartment may include seeds, and another compartment may include a dry fertilizer. In such configurations, the cart 14 is configured to deliver both the seeds and fertilizer to the implement 10 or tow vehicle. In the illustrate embodiment, the wheel assemblies 40 are rotatable relative to the cart 14, while the wheel assemblies 42 are in a fixed orientation. In alternative embodiments, the cart 14 may include a fewer or greater number of wheel assemblies. In the illustrated embodiment, the cart 14 is shown as it may appear when a tow vehicle is making a left turn. The wheel assemblies 40 are shown turned to the left, and the cart 14 is depicted as if it were being turned behind the implement 10. Furthermore, the cart 14 may be an air cart, or any other cart that may be towed behind the implement 10. The cart 14 is attached to the hitch assembly 12 in a manner that enables the cart 14 to follow the wing tool bars 18 when the implement 10 is in the depicted ground engaging position.

The cart hitch portion 16 of the hitch assembly 12 is shown in greater detail in FIGS. 3-4. However, it should be noted that two hitch arms 44 are connected to a cart articulation point 46. When the tool bars 18 are rotated rearwardly using transport actuators 48, the hitch arms 44 draw the cart 14 toward the hitch assembly 12 by pulling the cart 14 at the cart articulation point 46. It should also be noted that the cart hitch portion 16 may employ alternative mechanisms to pull the cart toward the implement as the tool bars rotate rearwardly. Such mechanisms may or may not use hitch arms and a cart articulation point. Additionally, the cart 14 is configured to be captured within the wing frames 20 when the implement 10 is in the folded transport position, thereby reducing the length and increasing the maneuverability of the towed assembly.

A controller (not shown) may be used in conjunction with the implement 10 and the cart 14. The controller may be connected to the actuators 32 and the transport actuators 48 to control and monitor the position of each actuator. In addition, sensors may be coupled to the wing frames 20, the row units, and/or the ground engaging tools. These sensors may provide feedback to the controller, such as position, temperature, and other operational characteristics.

Figure 2:
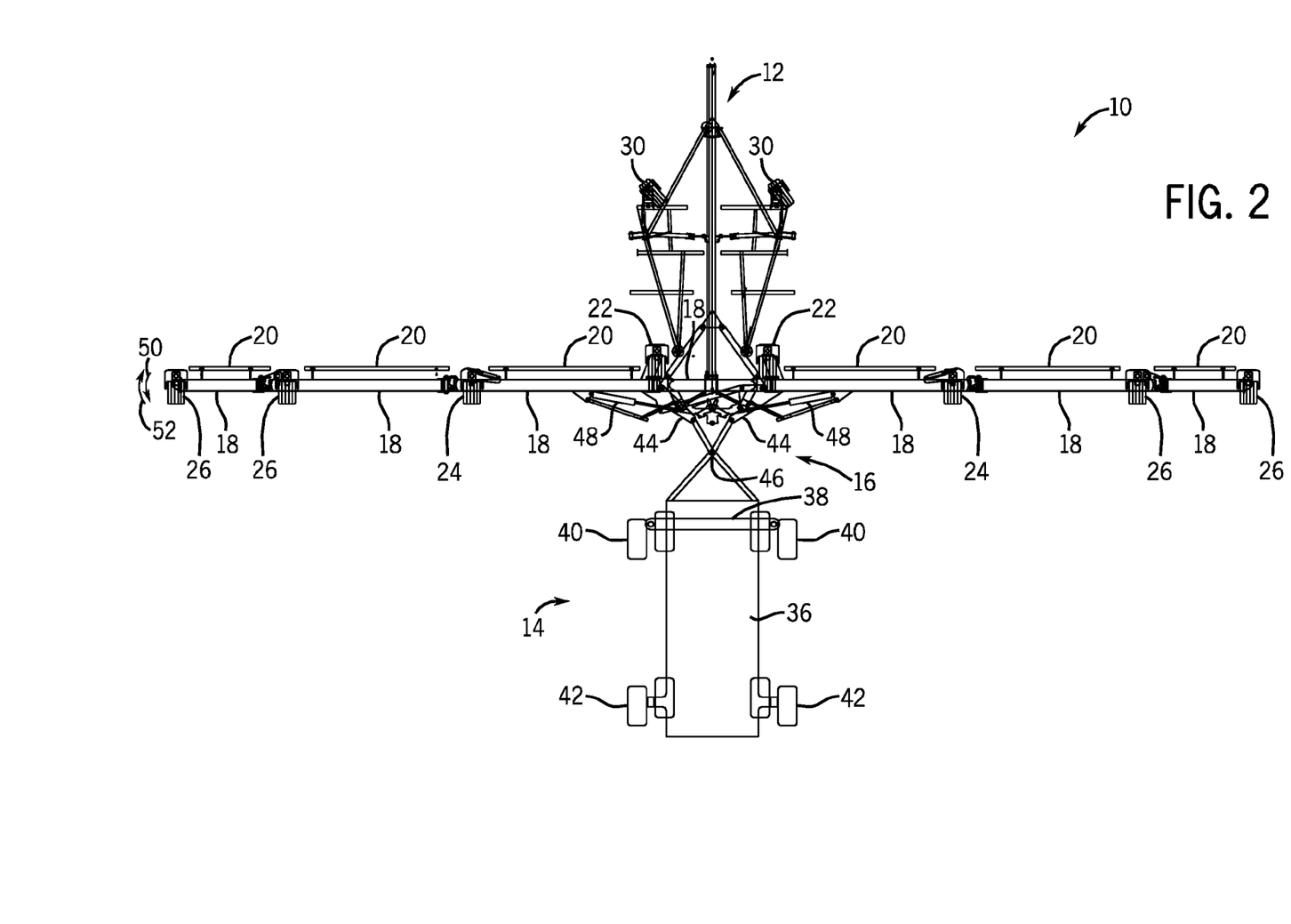
FIG. 2 is a top view of the folding implement, as shown in FIG. 1, with the wing frame assembly folded upward.

FIG. 2 is a top view of the folding implement 10, as shown in FIG. 1, with the wing frames 20 folded upward. Again, the implement 10 is shown coupled to the hitch assembly 12. The hitch assembly 12 is also connected to the cart 14 via the cart hitch portion 16, and the wing frames 20 are folded above the wing tool bars 18. In addition, the wheel assemblies 22, 24, 26 support the wing tool bars 18 and carry the load of the wing frames 20, and the wheel assemblies 30 support a section of the hitch assembly 12. The cart 14 is again depicted with storage tank 36, frame 38, and wheel assemblies 40, 42.

To transition the wing frames 20 from the ground engaging position to the folded transport position, hydraulic pressure is applied to actuators 32 (not shown), which retract respective piston rods, thereby causing the wing frames 20 to rotate in the upward direction 50 toward a location over the wing tool bars 18. Conversely, to transition the wing frames 20 from the folded transport position to the ground engaging position, hydraulic pressure is applied to actuators 32 (not shown), which extends the piston rod, thereby causing the wing frames 20 to rotate in a downward direction 52 toward the ground engaging position shown in FIG. 1. Additionally, position sensors may provide feedback to a controller regarding the position of the actuators 32, row units, and/or wing frames 20. Once the wing frames 20 are in the folded transport position, the tool bars 18 may be rotated rearwardly to the transport portion. The vertical orientation of the wing frames 20 helps to provide a narrow profile of the implement 10 and the cart 14 for transport, which allows for greater maneuverability.

FIG. 3 is a detailed top view of an embodiment of a cart 14 connected to a hitch assembly 12, with the folding implement 10 in a folded position between the ground engaging position and a transport position. As previously discussed, the hitch assembly 12 of the implement 10 is connected to the cart 14 via the cart hitch portion 16. The wing frames 20 are folded above the wing tool bars 18. Furthermore, the hitch arms 44 are connect the cart 14 at the cart articulation point 46, while the transport actuators 48 are shown at a transition point between the ground engaging position and the folded transport position. The transport actuators 48 may be operated using hydraulic pressure to cause the piston rods 58 to retract, thereby driving the wing tool bars 18 to rotate in a rearward direction 54. When fully retracted, the implement 10 is in the folded transport position.

Conversely, hydraulic pressure may be applied to the transport actuators 48 to cause the piston rods 58 to extend, thereby driving the tool bars 18 to rotate in a forward direction 56. When the tool bars 18 are fully extended, the wing frames 20 may be rotated in the downward direction to place the wing frames 20 in the ground engaging position.

The wheel assemblies 22 are coupled to the wing tool bars 18 using extension supports 60. While in the ground engaging position, the extension supports 60 remain in a position generally parallel to a support beam 70 of the hitch assembly 12. Furthermore, as the wing tool bars 18 rotate in a rearward direction, the extension supports 60 rotate to a position generally perpendicular to the support beam 70, thereby causing the wheel assemblies 22 to move away from one another. The wider stance enables the implement 10 to have greater stability during transport.

Additionally, when the transport actuators 48 are operated to rotate the tool bars 18 in a rearward direction 54, the hitch arms 44 pull the cart 14 toward the hitch assembly 12 at the cart articulation point 46. For example, the hitch arms 44 may move the cart 14 approximately two meters closer to the hitch assembly 12. As will be appreciated, the cart hitch portion 16 may be configured to cause the cart 14 to move laterally as it is drawn toward the hitch assembly 12. Moving the cart 14 toward the hitch assembly 12 enables the cart 14 and the implement 10 to transition to the folded transport position, thereby allowing the cart 14 and the implement 10 to be transported as if they were a single narrow unit FIG. 4 is a detailed top view of the folding implement 10, as shown in FIG. 1, in a folded transport position. Again, the implement 10 is shown coupled to the hitch assembly 12. The hitch assembly 12 is connected to the cart 14 via the cart hitch portion 16. The wing frames 20 are shown folded above the wing tool bars 18. The wheel assemblies 22, 24 are also shown supporting the wing tool bars 18, and carrying the load of the wing frames 20. In addition, the wheel assemblies 30 are shown supporting a section of the hitch assembly 12.

It should be noted that wheel assemblies 22 and 40 are both configured to rotate, while wheel assemblies 24 and 42 are locked in a fixed orientation. Being grouped in this manner allows the cart 14 and the implement 10 to be transported as a single unit with a common steering center and helps to maintain stability and turning capabilities. Conversely, the cart 14 and the implement 10 are configured to operate as two separate units while in the ground engaging position.

As previously discussed, the transport actuators 48 may be operated using hydraulic pressure to cause the piston rods 58 to retract, thereby inducing the tool bars 18 to rotate in the rearward direction 54. When the tool bars 18 are fully retracted, the implement 10 is in the folded transport position. Conversely, hydraulic pressure may be applied to the transport actuators 48 to cause the piston rods 58 to extend, thereby inducing the tool bars 18 to rotate in the forward direction 56. When the tool bars 18 are fully extended, the wing frames 20 may be rotated in the downward direction to place the implement 10 in the ground engaging position.

Furthermore, as previously discussed, when the transport actuators 48 are operated to rotate the tool bars 18 in a rearward direction 54, the hitch arms 44 pull the cart 14 toward the hitch assembly 12 at the cart articulation point 46. As shown in FIG. 4, when in the folded transport position, the cart 14 is positioned such that the cart articulation point 46 is located adjacent to the intersection of the wing tool bar 18 and the hitch assembly 12.

In addition, the extension supports 60 are shown in the folded transport position, extending in a direction generally perpendicular to the support beam 70. The wheel assemblies 22 provide a wider track in the illustrated transport position than in the ground engaging position. For example, the distance between the wheel assemblies 22 may be approximately 10 feet in the ground engaging position, while the distance between the wheel assemblies 22 in the folded transport position may be approximately 16 feet. As previously discussed, the wider track improves stability during transport.

Figure 5:
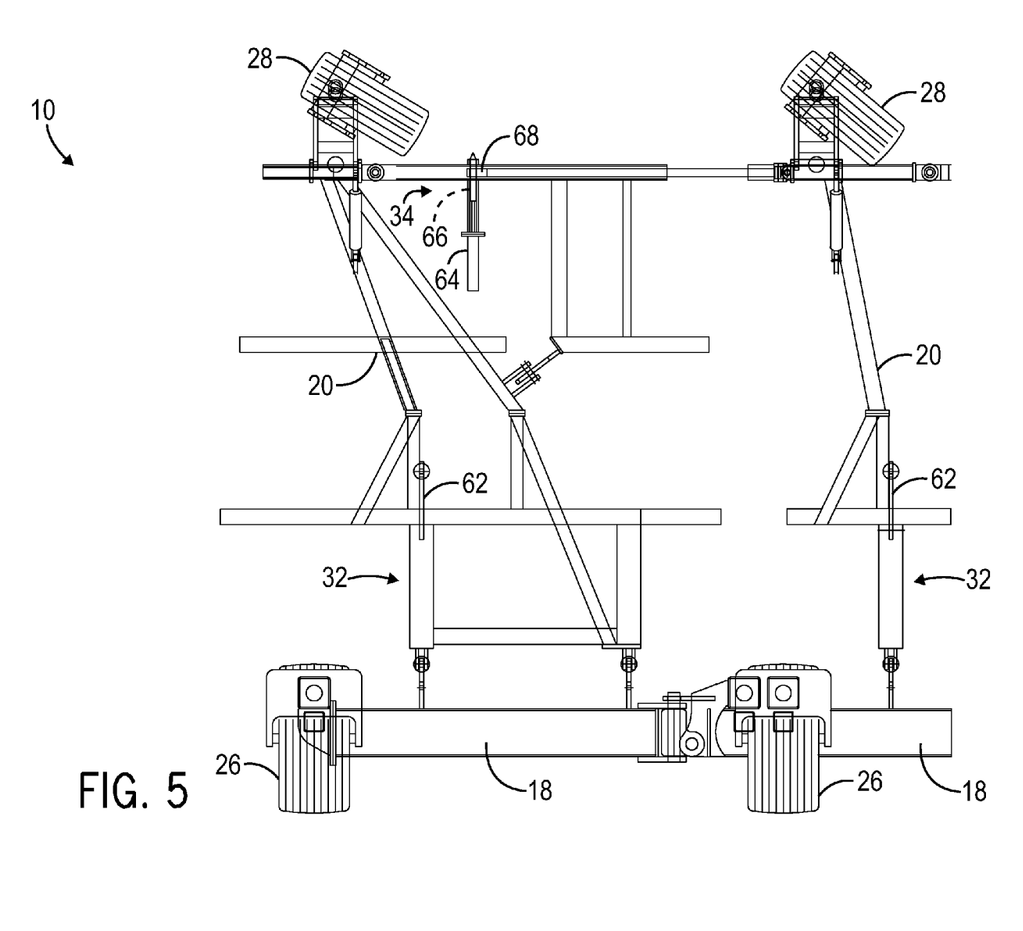
FIG. 5 is a detailed top view a section of the wing frame, as shown in FIG. 1.

FIG. 5 is a detailed top view a section of the wing frame 20, as shown in FIG. 1. The implement 10 includes the wing tool bars 18, wing frames 20 and wheel assemblies 26, 28. The wing frames 20 further include actuators 32 and locking mechanisms 34, and each actuator 32 includes piston rod 62. As previously discussed, when hydraulic pressure is applied to an actuator, the piston rod 62 either extends or retracts. When the piston rods 62 extend, the wing frames 20 are lowered into the ground engaging position, and when the piston rods 62 retract, the wing frames 20 are raised into the folded position. Furthermore, the actuators 32 may be controlled using a controller or another device, such as a switch, to rotate the wing frames 20 between the folded and ground engaging positions.

The locking mechanisms 34 each include a cylinder 64, a bolt 66 and a telescopic section insertion point 68. Application of hydraulic fluid pressure to a cap end will cause the cylinder 64 to extend, thereby inserting the bolt 66 into the telescopic section insertion point 68. Conversely, application of hydraulic fluid pressure to a rod end will cause the cylinder 64 to retract, thereby removing the bolt 66 from the telescopic section insertion point 68. The cylinder 64 may be configured to automatically insert the bolt 66 into the telescopic section insertion point 68 when the wing frames 20 are lowered to the ground engaging position. Additionally, cylinder 64 may be configured to automatically remove the bolt 66 from the telescopic section 68 when the wing frames 20 are raised to the folded position. Furthermore, the cylinder 64 may be operated using a controller or a switch, for example.

Inserting the bolt 66 into the telescopic section insertion point 68 blocks movement of the wing frames 20 with respect to one another. Consequently, the alignment of the ground engaging tools with the direction of travel will be substantially maintained while the implement 10 is in the ground engaging position. However, once the bolt 66 is removed, the wing frame sections are allowed to articulate, thereby facilitating greater motion of the wing frame sections. As a result, the wing frames 20 will experience less bending and stress during transport.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement, comprising:
a hitch assembly comprising a support beam and a first plurality of wheels, wherein the hitch assembly is configured to couple to a tow vehicle;
a plurality of wing tool bars pivotally coupled transversely to the hitch assembly and configured to fold rearwardly to a transport position;
a second plurality of wheels coupled to the plurality of wing tool bars, the second plurality of wheels configured to support the wing tool bars while in the transport position;
a plurality of wing frames pivotally coupled to the plurality of wing tool bars, wherein each wing frame is configured to support a plurality of row units and to fold over a respective wing tool bar, each wing frame is positioned forward of a respective wing tool bar relative to a direction of travel, and each wing tool bar is configured to transfer torque to the plurality of row units when the plurality of wing frames is in a ground engaging position;
a third plurality of wheels coupled to the plurality of wing frames;
a plurality of actuators coupled to the plurality of wing tool bars and configured to direct the plurality of wing frames to fold over the plurality of wing tool bars; and
a cart coupled to the hitch assembly, wherein the cart is configured to follow the plurality of wing tool bars, and the plurality of wing tool bars is configured to capture the cart within the plurality of wing frames when in the transport position.

2. The agricultural implement of claim 1, wherein the hitch assembly comprises a hitch arm coupled to the cart, and the hitch arm is configured to move the cart toward the hitch assembly when the plurality of wing tool bars is pivotally rotated rearwardly to the transport position.

3. The agricultural implement of claim 1, wherein the cart comprises an air cart.

4. The agricultural implement of claim 1, comprising a first wheel assembly of the second plurality of wheels coupled to a first wing tool bar adjacent to the hitch assembly and a second wheel assembly of the second plurality of wheels coupled to a second wing tool bar adjacent to the hitch assembly, wherein the first and second wheel assemblies are configured to move away from one another to provide additional stability while in the transport position.

5. The agricultural implement of claim 4, wherein rotation of the plurality of wing tool bars from the ground engaging position to the transport position drives the first and second wheel assemblies away from one another to expand the track of the first and second wheel assemblies.

6. The agricultural implement of claim 1, wherein the plurality of wing frames comprises a plurality of locking mechanisms configured to selectively allow articulation of the plurality of wing frames during transport.

7. The agricultural implement of claim 6, wherein each locking mechanism is configured to block articulation by inserting a pin into an insertion point on a respective wing frame, and to facilitate articulation by removing the pin from the insertion point on the respective wing frame.

8. The agricultural implement of claim 7, wherein each locking mechanism includes a cylinder configured to remove the pin when the respective wing frame is placed in the transport position, and to insert the pin when the respective wing frame is placed in the ground engaging position.

9. The agricultural implement of claim 1, wherein each row unit comprises at least one ground engaging tool configured to engage soil.

10. An agricultural implement, comprising:
a hitch assembly comprising a support beam and a first plurality of wheels, wherein the hitch assembly is configured to couple to a tow vehicle;
a plurality of wing tool bars pivotally coupled transversely to the hitch assembly;
a second plurality of wheels coupled to the plurality of wing tool bars, the second plurality of wheels configured to support the wing tool bars while in a transport position;
a plurality of wing frames pivotally coupled to the plurality of wing tool bars, wherein each wing frame is configured to support a plurality of row units and to fold over a respective wing tool bar, each wing frame is positioned forward of a respective wing tool bar relative to a direction of travel, and each wing tool bar is configured to transfer torque to the plurality of row units when the plurality of wing frames is in a ground engaging position;
a third plurality of wheels coupled to the plurality of wing frames;
a cart coupled to the hitch assembly, wherein the cart is configured to follow the plurality of wing tool bars, the plurality of wing tool bars is configured to fold rearwardly to the transport position, and the plurality of wing tool bars is configured to capture the cart within the plurality of wing frames when in the transport position; and
a plurality of actuators coupled to the plurality of wing tool bars and configured to direct the plurality of wing frames to fold over the plurality of wing tool bars.

11. The agricultural implement of claim 10, wherein the hitch assembly comprises a hitch arm coupled to the cart, and the hitch arm is configured to move the cart toward the hitch assembly when the plurality of wing tool bars is pivotally rotated rearwardly to the transport position.

12. The agricultural implement of claim 10, wherein the cart comprises an air cart.

13. An agricultural implement, comprising:
a hitch assembly comprising a support beam, wherein the hitch assembly is configured to couple to a tow vehicle;
a plurality of wing tool bars pivotally coupled transversely to the hitch assembly and configured to fold rearwardly to a transport position;
a plurality of wing frames pivotally coupled to the wing tool bars, wherein each wing frame is configured to support a plurality of row units and to fold over a respective wing tool bar, each wing frame is positioned forward of a respective wing tool bar relative to a direction of travel, and each wing tool bar is configured to transfer torque to the plurality of row units when the plurality of wing frames is in a ground engaging position;
a first wheel assembly coupled to a first wing tool bar adjacent to the hitch assembly and a second wheel assembly coupled to a second wing tool bar adjacent to the hitch assembly, wherein the first and second wheel assemblies are configured to support the first and second wing tool bars, respectively, while in the transport position, and to move away from one another to provide additional stability while in the transport position; and
a plurality of actuators coupled to the plurality of wing tool bars and configured to direct the plurality of wing frames to fold over the plurality of wing tool bars;
wherein rotation of the plurality of wing tool bars from the ground engaging position to the transport position drives the first and second wheel assemblies away from one another to expand the track of the first and second wheel assemblies.

14. The agricultural implement of claim 13, wherein the plurality of wing frames comprises a plurality of locking mechanisms configured to selectively allow articulation of the plurality of wing frames during transport.

15. The agricultural implement of claim 14, wherein each locking mechanism is configured to block articulation by inserting a pin into an insertion point on a respective wing frame, and to facilitate articulation by removing the pin from the insertion point on the respective wing frame.

16. The agricultural implement of claim 15, wherein each locking mechanism includes a cylinder configured to remove the pin when the respective wing frame is placed in a transport position, and to insert the pin when the respective wing frame is placed in the ground engaging position.

* * * * *